United States Patent
Hanagan

(10) Patent No.: US 10,897,166 B1
(45) Date of Patent: Jan. 19, 2021

(54) METHOD AND APPARATUS TO CONTROL AN ARMATURE ROTATING WITHIN A MAGNETIC CIRCUIT

(71) Applicant: Michael Hanagan, Hollister, CA (US)

(72) Inventor: Michael Hanagan, Hollister, CA (US)

(*) Notice: Subject to any disclaimer, the term of this patent is extended or adjusted under 35 U.S.C. 154(b) by 0 days.

(21) Appl. No.: 16/721,694

(22) Filed: Dec. 19, 2019

(51) Int. Cl.
| H02K 1/16 | (2006.01) |
| H02K 1/14 | (2006.01) |
| H02K 5/16 | (2006.01) |
| H02K 21/10 | (2006.01) |
| H02K 1/27 | (2006.01) |

(52) U.S. Cl.
CPC ............ *H02K 1/16* (2013.01); *H02K 1/14* (2013.01); *H02K 1/2706* (2013.01); *H02K 5/16* (2013.01); *H02K 21/10* (2013.01)

(58) Field of Classification Search
CPC .................................. H02K 1/16; H02K 1/14
USPC ................. 310/269, 266, 114, 105, 106
See application file for complete search history.

(56) References Cited

U.S. PATENT DOCUMENTS

| 5,015,903 A * | 5/1991 | Hancock ........... H02K 19/103 310/168 |
| 5,675,203 A * | 10/1997 | Schulze ........... B60L 15/2054 310/113 |
| 2007/0164628 A1* | 7/2007 | Fonseca ............... B60L 50/61 310/112 |
| 2008/0150294 A1* | 6/2008 | Jones ............... H02K 21/025 290/55 |
| 2008/0174194 A1* | 7/2008 | Qu ..................... H02K 21/12 310/114 |
| 2011/0012458 A1* | 1/2011 | Atallah ................. H02K 7/11 310/103 |
| 2012/0119509 A1* | 5/2012 | West ..................... F02B 37/00 290/1 C |

* cited by examiner

*Primary Examiner* — Terrance L Kenerly
(74) *Attorney, Agent, or Firm* — Heimlich Law, PC; Alan Heimlich, Esq.

(57) ABSTRACT

A Method and Apparatus to Control an Armature Rotating within a Magnetic Circuit have been disclosed. A rotatable radial field control is positioned between permanent magnets on a rotatable armature that is positioned within a stator. The rotatable radial field control rotation controls the rotation of the armature.

20 Claims, 22 Drawing Sheets

METHOD AND APPARATUS TO CONTROL AN ARMATURE ROTATING WITHIN A MAGNETIC CIRCUIT

FIELD OF THE INVENTION

The present invention pertains to a magnetic circuit. More particularly, the present invention relates to a Method and Apparatus to Control an Armature Rotating within a Magnetic Circuit.

BACKGROUND OF THE INVENTION

Electromagnetics are currently used in a stator and/or armature to control rotation. Electromagnetics requires the use of electricity.

This presents a technical problem for which a technical solution is needed using a technical means.

BRIEF DESCRIPTION OF THE DRAWINGS

The invention is illustrated by way of example and not limitation in the figures of the accompanying drawings. Same numbered items are not necessarily alike.

The accompanying Figures illustrate various non-exclusive embodiments of the invention.

DETAILED DESCRIPTION

A Method and Apparatus to Control an Armature Rotating within a Magnetic Circuit is disclosed.

As used in this specification, armature or similar language refers to a rotating assembly, commonly called a rotor. As used in this specification, a stator or similar language refers to a stationary non-rotating assembly with respect to the armature.

Depending upon the construction of the armature and stator, either the outside assembly can be stationary with the inner assembly rotating, or if the inner assembly is stationary the outer assembly can rotate.

While embodiments of the invention may illustrate a particular orientation of a magnetic field, it is to be understood that the orientation is for explanation and not a required orientation. That is, embodiments having the magnetic fields in other orientations are also possible.

Figure 1:
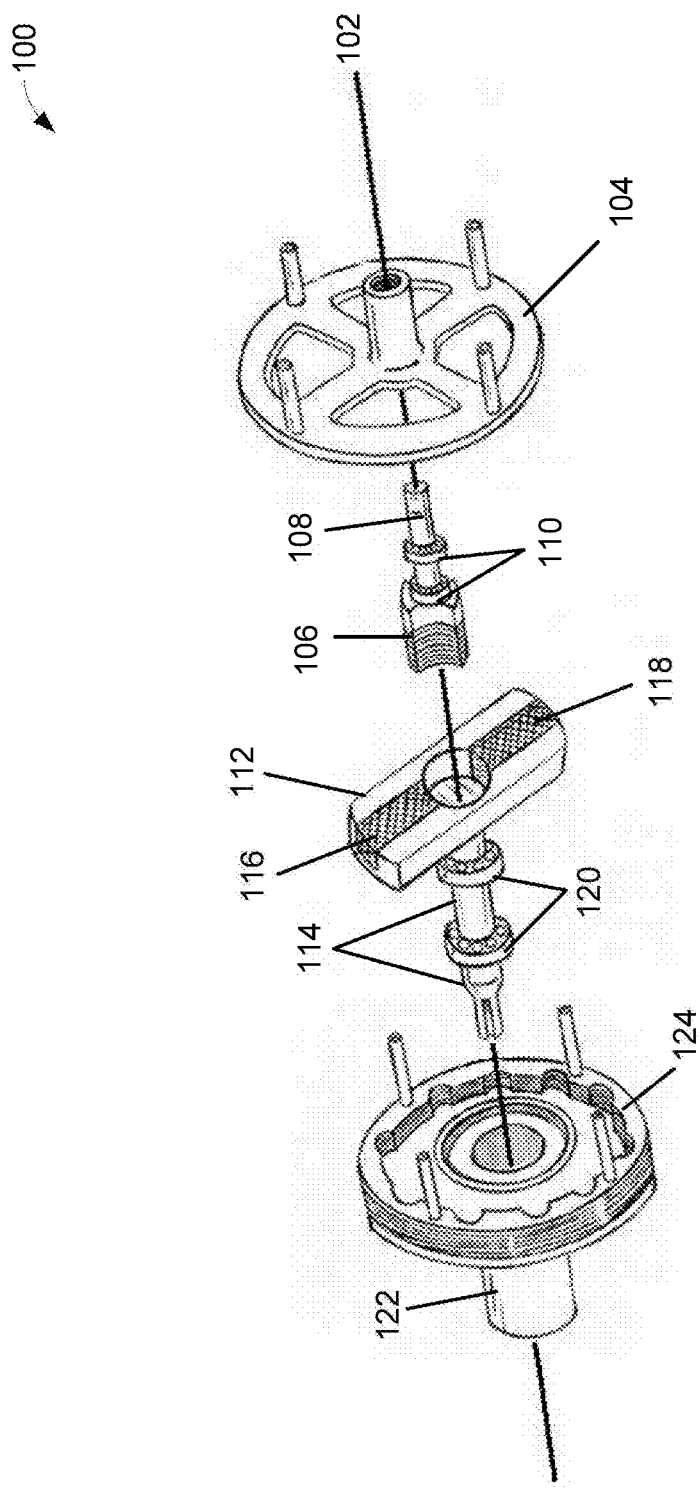
FIG. 1 illustrates, generally at 100, an exploded view of one embodiment of the invention showing an arrangement of major components along a longitudinal axis

FIG. 1 illustrates, generally at 100, an exploded view of one embodiment of the invention showing an arrangement of major components along a longitudinal axis 102. At 104 is an input housing. At 106 is a radial field control which is mounted on a control shaft 108 which can pass through input housing 104. Bearings 110 are mounted on the control shaft 108. Radial field control 106 is made up of one or more laminations. The one or more laminations of radial field control 106 have a lower reluctance than air, that is, the one or more laminations of radial field control 106 have a higher permeability than air. At 112 is an armature which is mounted on output shaft 114. The armature 112 houses two permanent magnets 116 and 118. Bearings 120 are mounted on the output shaft 114. At 122 is an output housing. The output shaft 114 can pass through the output housing 122. The output housing 122 has a stator 124. Stator 124 is made up of one or more laminations. The one or more laminations of stator 124 have a lower reluctance than air, that is, the one or more laminations of the stator 124 have a higher permeability than air. It should be noted that even though control shaft 108's longitudinal axis and output shaft 114's longitudinal axis are coaxial and along the longitudinal axis 102, the control shaft 108 and output shaft 114 are not physically joined and can rotate independently of each other.

Figure 2:
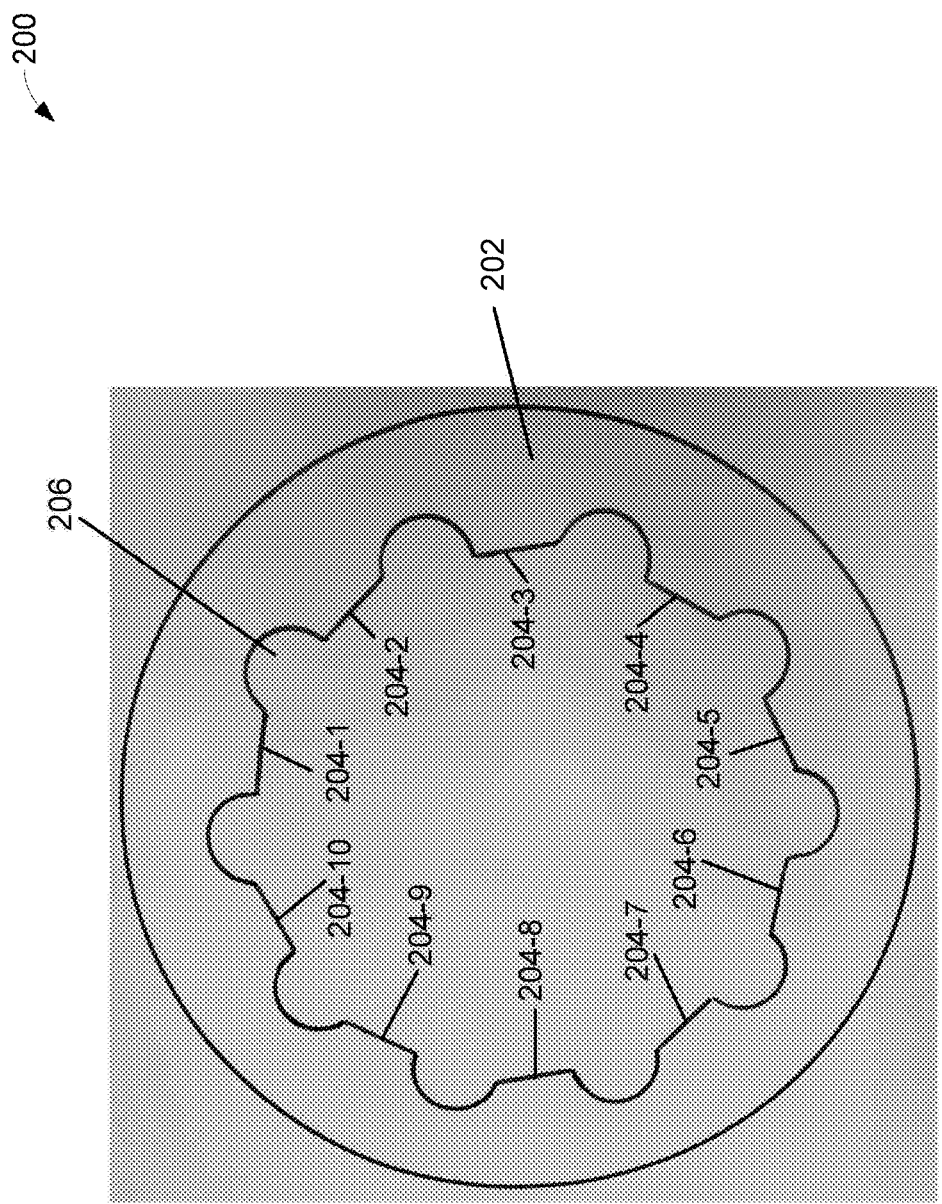
FIG. 2 illustrates, generally at 200, one embodiment of the invention showing a stator lamination.

FIG. 2 illustrates, generally at 200, one embodiment of a stator lamination 202. The stator lamination 202 (similar to one illustrated in FIG. 1 at 124) has 10 pole tips as indicated at 204-1 through 204-10. However, the invention is not so limited and the number of pole tips can be two or more. It should be noted that the pole tips need not be flat or curved symmetrically about a central axis of the stator 202. Between the pole tips (204-1 through 204-10) are stator cutouts as representatively illustrated by the single stator cutout at 206. There are 10 such cutouts illustrated in FIG. 2. The cutouts which expose air have a lower permeability than the stator lamination 202.

Figure 3:
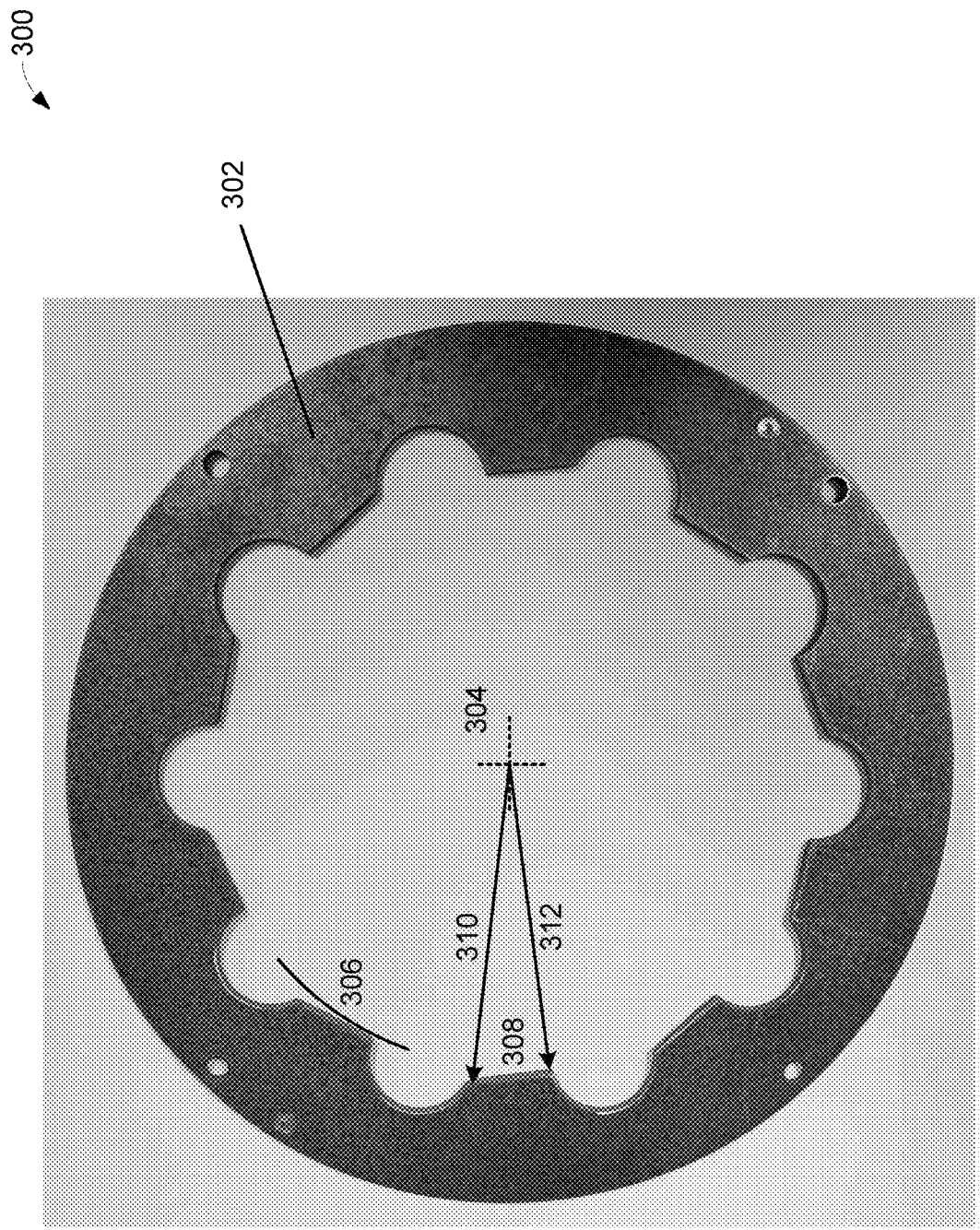
FIG. 3 illustrates, generally at 300, one embodiment of the invention showing a stator lamination.

FIG. 3 illustrates, generally at 300, one embodiment of a stator lamination 302. The stator lamination 302 has 10 pole tips (similar to one illustrated in FIG. 2 at 202, e.g. as indicated at 204-1 through 204-10 in FIG. 2). At 304 is indicated a center at the intersection of a short dashed vertical and a short dashed horizontal line. At 306 is an illustrative radius arc from 304. What can be seen is that the pole tip near 306 does not have a constant radius from 304. That is, the distance on a similar pole tip at 308 has distance 310 greater than distance 312.

Figure 4:
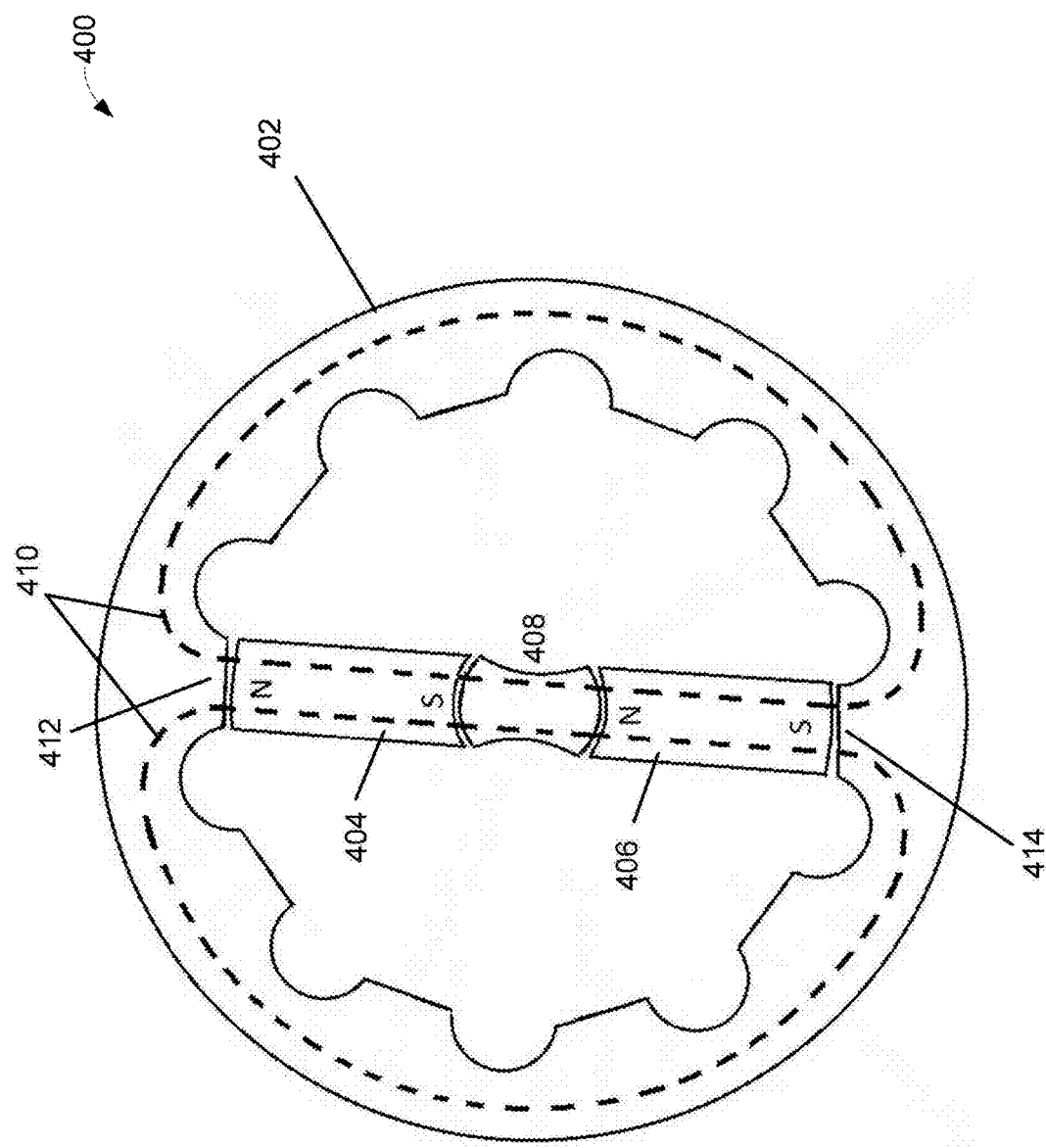
FIG. 4 illustrates, generally at 400, one embodiment of the invention showing the radial field control, and the armature magnets, and stator pole tips in alignment.

FIG. 4, FIG. 5, FIG. 6, and FIG. 7 illustrate, generally at 400, 500, 600, and 700 one embodiment of the invention showing movement of a radial field control and an armature. In FIG. 4 is a stator 402 having pole tips (as illustrated in e.g. as indicated at 204-1 through 204-10 in FIG. 2). At 404 and 406 are two permanent magnets which are part of the armature (that is 404 and 406 rotate together). N and S denoted on the two permanent magnets are the North and South poles. At 408 is the radial field control. The dashed lines 410 are representative of magnetic lines of flux. In FIG. 4 the North pole of permanent magnet 404 is lined up with pole tip 412 of the stator 402, and the South pole of permanent magnet 406 is lined up with pole tip 414 of the stator 402. In FIG. 4 the radial field control 408 is lined up with the South pole of permanent magnet 404 and the North pole of permanent magnet 406. This is illustrated by the parallel lines of magnetic flux. The curved lines of magnetic flux in stator 402 are due to the higher permeability of stator 402 than air.

Figure 5:
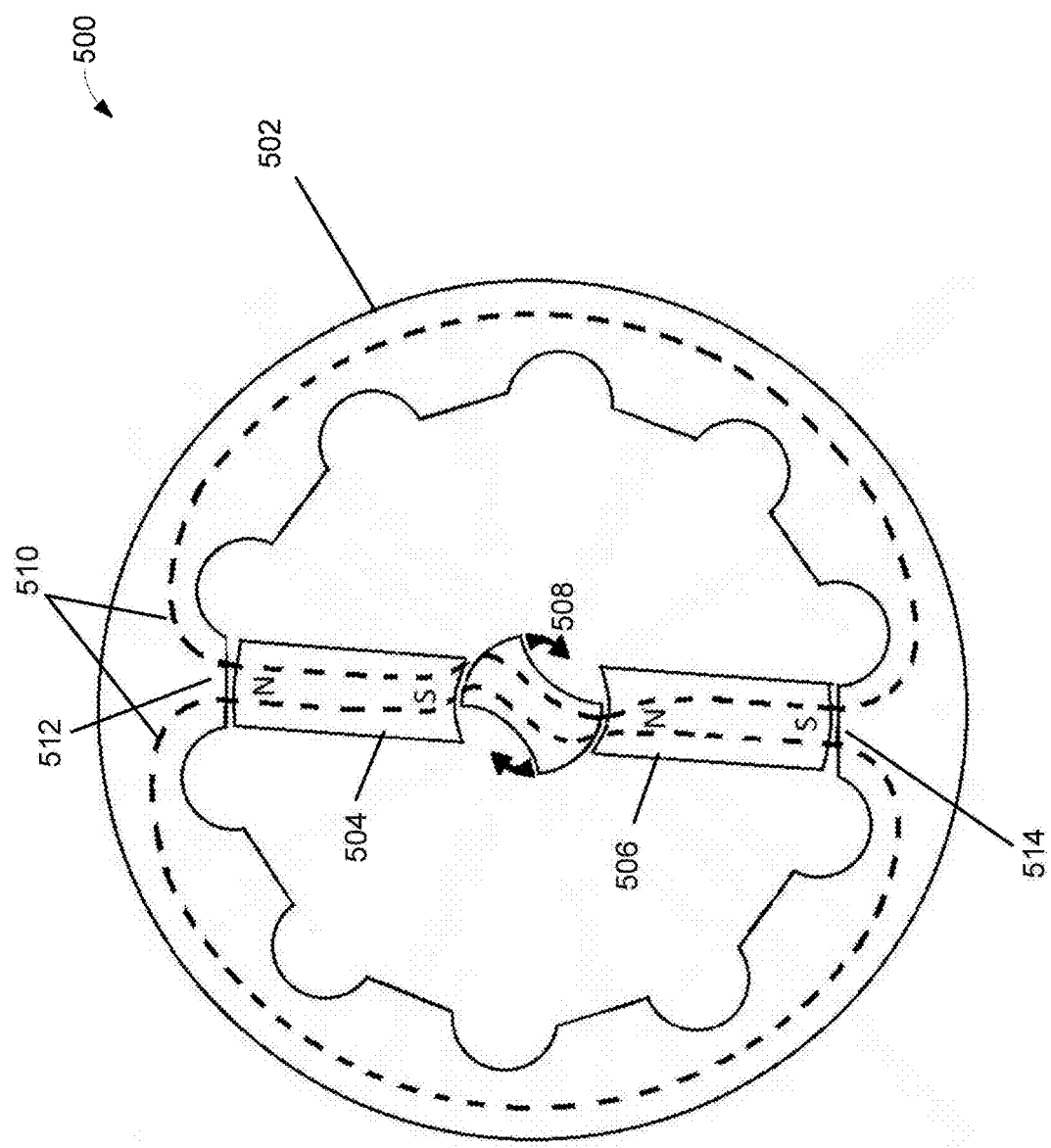
FIG. 5 illustrates, generally at 500, one embodiment of the invention showing the radial field control rotated clockwise.

In FIG. 5 is a stator 502 having pole tips (as illustrated in e.g. as indicated at 205-1 through 205-10 in FIG. 2). At 504 and 506 are two permanent magnets which are part of the armature (that is 504 and 506 rotate together). N and S denoted on the two permanent magnets are the North and South poles. At 508 is the radial field control which has started to rotate clockwise. The dashed lines 510 are representative of magnetic lines of flux and as can be seen in FIG. 5 the magnetic lines of flux close to the South pole of permanent magnet 504, the radial field control 508, and the North pole of permanent magnet 506 are being distorted from where they were in FIG. 4. In FIG. 5 the North pole of permanent magnet 504 is still lined up with pole tip 512 of the stator 502, and the South pole of permanent magnet 506 is still lined up with pole tip 514 of the stator 502 because permanent magnets 504 and 506 have not yet started rotating. In FIG. 5 the radial field control 508 is displaced from the South pole of permanent magnet 504 and displaced from the North pole of permanent magnet 506 because of the clockwise rotation of radial field control 508. This is illustrated by the distorted lines of magnetic flux. The curved lines of magnetic flux in stator 502 are due to the higher permeability of stator 502 than air.

Figure 6:
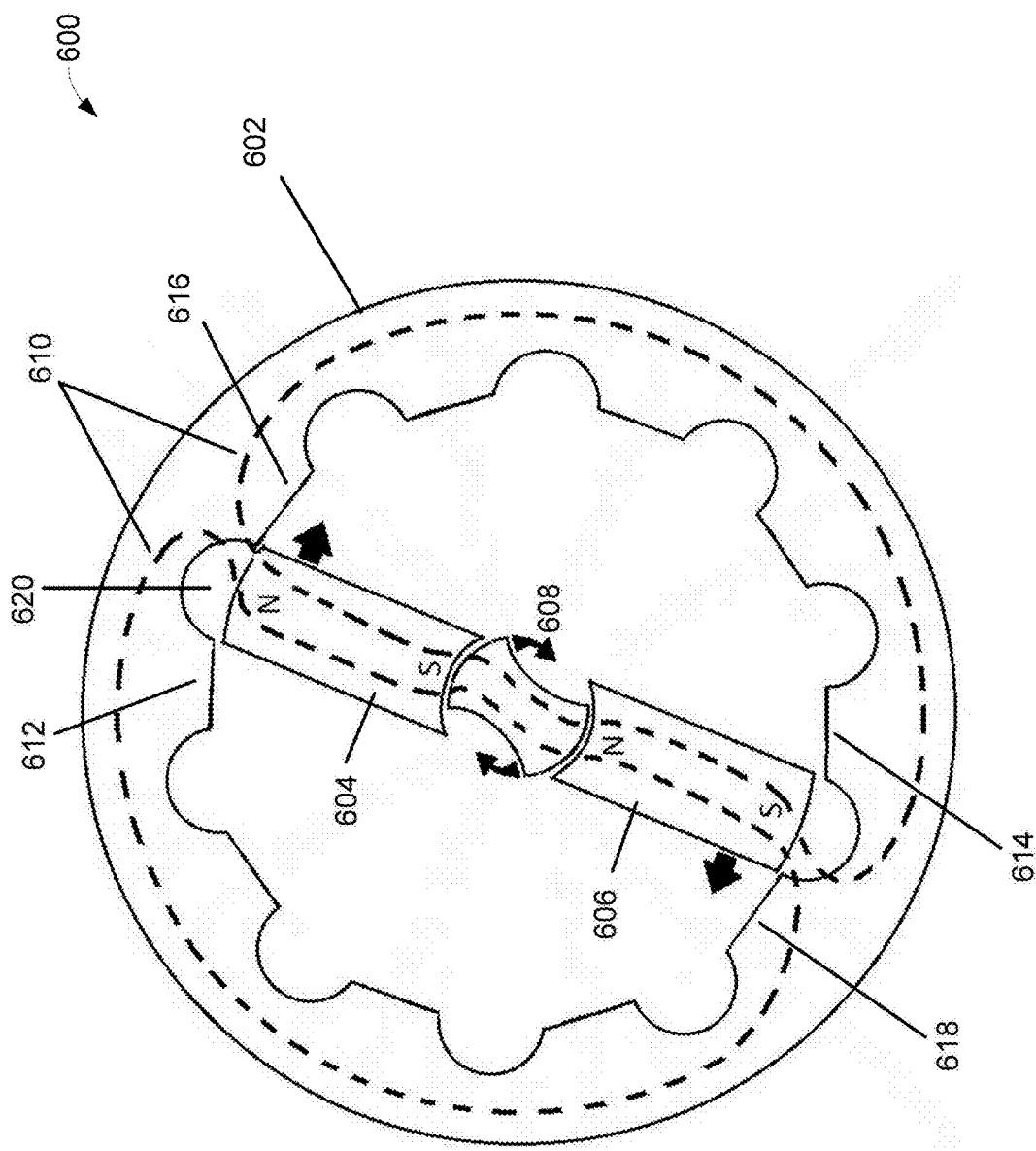
FIG. 6 illustrates, generally at 600, one embodiment of the invention showing the armature rotating clockwise.

In FIG. 6 is a stator 602 having pole tips (as illustrated in e.g. as indicated at 205-1 through 205-10 in FIG. 2). At 604 and 606 are two permanent magnets which are part of the armature (that is 604 and 606 rotate together). N and S denoted on the two permanent magnets are the North and South poles. At 608 is the radial field control which has rotated clockwise. The dashed lines 610 are representative of magnetic lines of flux and as can be seen in FIG. 6 the magnetic lines of flux close to the South pole of permanent magnet 604, the radial field control 608, and the North pole of permanent magnet 606 are still distorted from where they were in FIG. 4. In FIG. 6 the North pole of permanent magnet 604 is moving from pole tip 612 toward pole tip 616 of the stator 602, and the South pole of permanent magnet 606 is moving from pole tip 614 toward pole tip 618 of the stator 602 because the armature (of which permanent magnet 604 and 606 are part of the armature) is rotating clockwise. In FIG. 6 the radial field control 608 is still slightly displaced from the South pole of permanent magnet 604 and slightly displaced from the North pole of permanent magnet 606 because of the clockwise rotation of radial field control 608. This is illustrated by the slightly distorted lines of magnetic flux. The curved lines of magnetic flux in stator 602 are due to the higher permeability of stator 602 than air.

Between the pole tips as represented, for example, by 612 and 620 are stator cutouts as representatively illustrated by the single stator cutout at 620. There are 10 such cutouts illustrated in FIG. 6. The cutouts as represented by 620 expose air which has a lower permeability than the stator 602 and so the result is that the magnetic lines of flux concentrate at the pole tips near the outer ends of the armature. Thus, the armature tends to try and move toward the nearest pole tips (e.g. N pole of 604, and S pole of 606).

Figure 7:
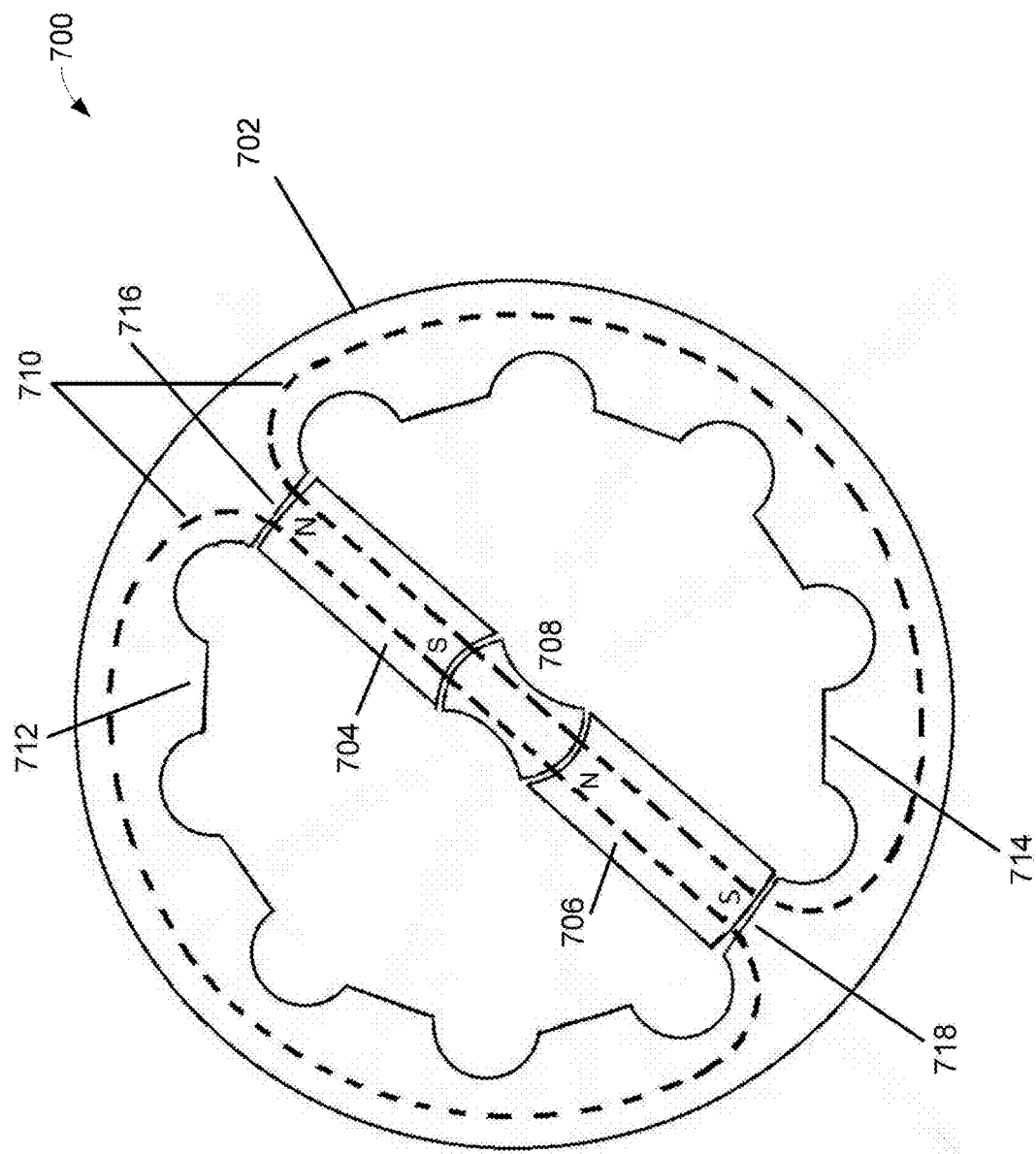
FIG. 7 illustrates, generally at 700, one embodiment of the invention showing the radial field control, and the armature magnets, and stator pole tips in radial alignment after the radial field control and armature have rotated clockwise.

In FIG. 7 is a stator 702 having pole tips (as illustrated in e.g. as indicated at 205-1 through 205-10 in FIG. 2). At 704 and 706 are two permanent magnets which are part of the armature (that is 704 and 706 rotate together). N and S denoted on the two permanent magnets are the North and South poles. At 708 is the radial field control which has rotated clockwise to the position shown (in line with magnetic poles 716 and 718). The dashed lines 710 are representative of magnetic lines of flux and as can be seen in FIG. 7 the magnetic lines of flux close to the South pole of permanent magnet 704, the radial field control 708, and the North pole of permanent magnet 706 are lined up again as they were in FIG. 4 but at a position from pole tips 716 and 718 (rather than pole tips 712 and 714 as shown in FIG. 4). In FIG. 7 the North pole of permanent magnet 704 is proximate to pole tip 716 of the stator 702, and the South pole of permanent magnet 706 is proximate to pole tip 718 of the stator 702. From FIG. 4 to FIG. 7 the radial field control 708 and the armature having permanent magnets 704 and 706 has rotated from pole tips 712 and 714 in FIG. 4 to the pole tips 716 and 718 in FIG. 7. The curved lines of magnetic flux in stator 702 are due to the higher permeability of stator 702 than air.

What is to be appreciated is that using the techniques described it is possible to control the output shaft rotation via the control shaft rotation without the use of electricity or electronics. That is, the rotating armature is controlled by the radial field control using magnetics in a magnetic circuit without the use of electricity.

Figure 8:
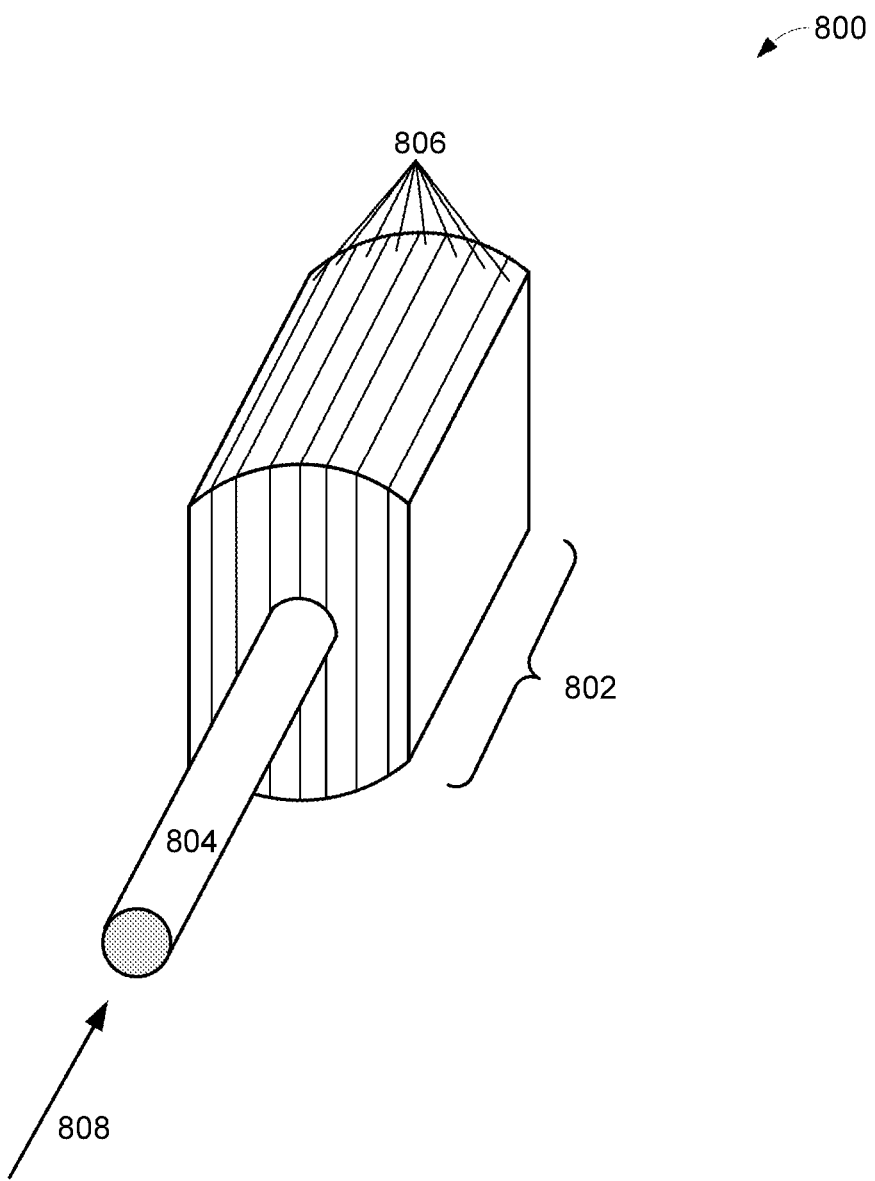
FIG. 8 illustrates, generally at 800, one embodiment of the invention showing a radial field control.

FIG. 8 illustrates, generally at 800, one embodiment of a radial field control 802 attached to a control shaft 804. The laminations 806 of the radial field control 802 are parallel with the longitudinal axis 808 of the control shaft 804. However, the invention is not so limited.

Figure 9:
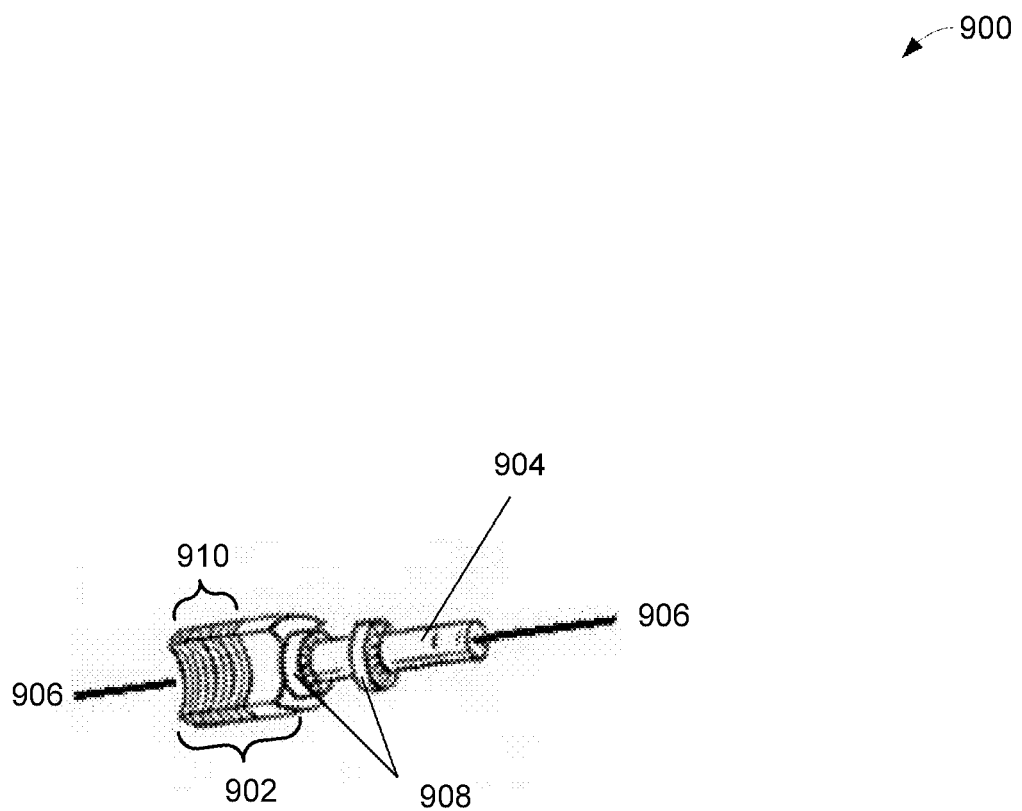
FIG. 9 illustrates, generally at 900, one embodiment of the invention showing a radial field control.

FIG. 9 illustrates, generally at 900, one embodiment of a radial field control 902 attached to a control shaft 904, having a longitudinal axis 906. Mounted on the control shaft 904 are bearings 908. The radial field control 902 has laminations 910 which are perpendicular to the longitudinal axis 906 of the control shaft 904.

Figure 10:
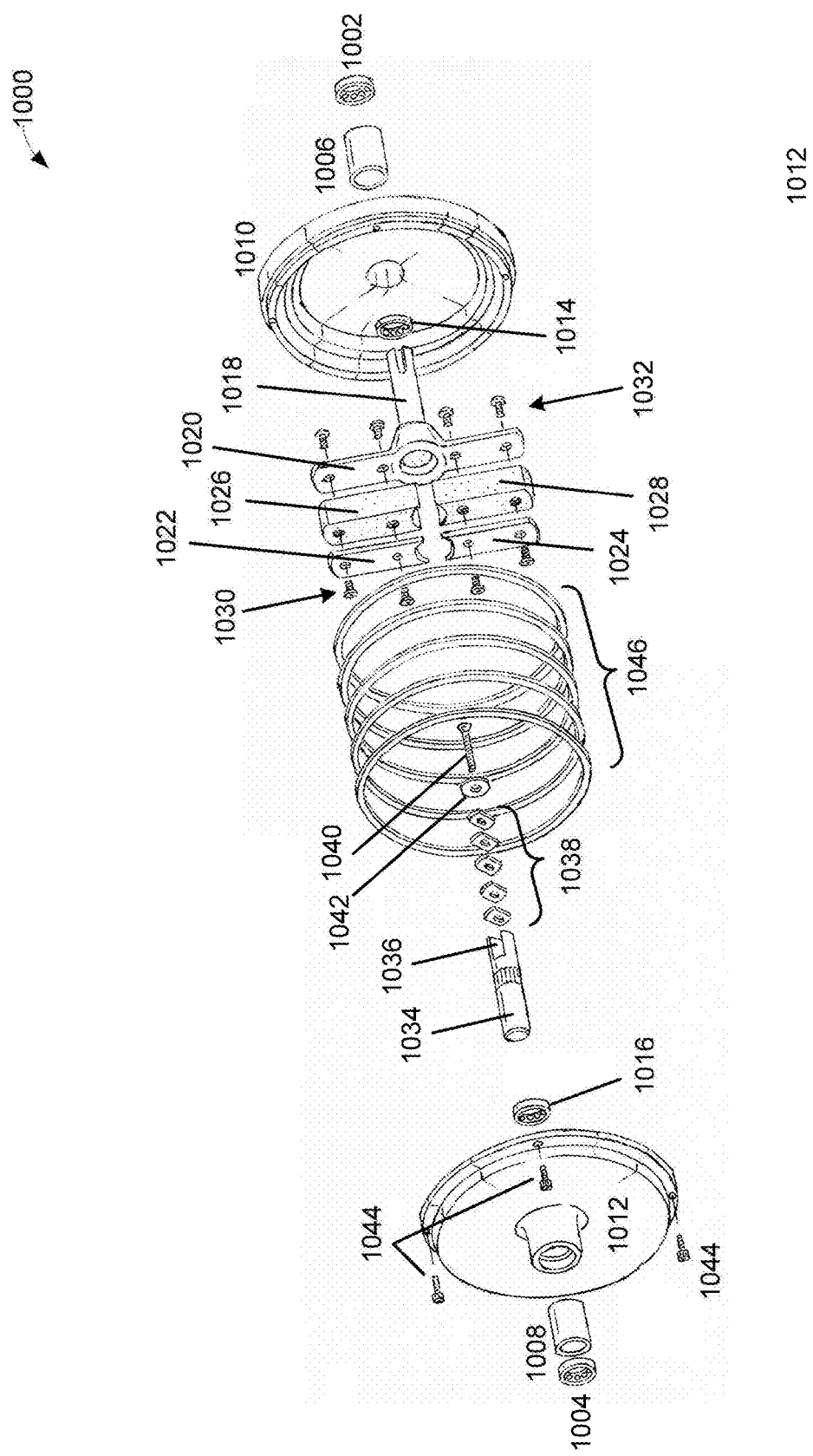
FIG. 10 illustrates, generally at 1000, an exploded view of one embodiment of the invention showing an arrangement of major components.

FIG. 10 illustrates, generally at 1000, an exploded view of one embodiment of the invention showing an arrangement of major components along a longitudinal axis extending from bearing 1002 to bearing 1004. At 1006 and 1008 are bearing spacers that are inserted respectively into output housing 1010 and input housing 1012 and separate respectively bearing 1002 and bearing 1014, and bearing 1004 and bearing 1016. At 1018 is an output shaft which is connected to member 1020. Screws along arrow 1032 are used for securing member 1020 to permanent magnet 1026 and permanent magnet 1028, as are screws along 1030 for attaching member 1022 and member 1024 to permanent magnet 1026 and permanent magnet 1028 respectively. At 1034 is a control shaft having a slot 1036 for holding laminations 1038 which are part of the radial field control. The laminations 1038 are secured into slot 1036 and the control shaft 1034 by washer 1042 and screw 1040. At 1046 are shown stator laminations which as illustrated here do not have pole tips illustrated. Stator laminations 1046 fit within the input housing 1012 and output housing 1010 enclosure. Control shaft 1034 goes through bearing 1016, spacer 1008, input housing 1012, and bearing 1004. Input housing 1012 is secured to output housing 1010 via screws 1044.

Figure 11:
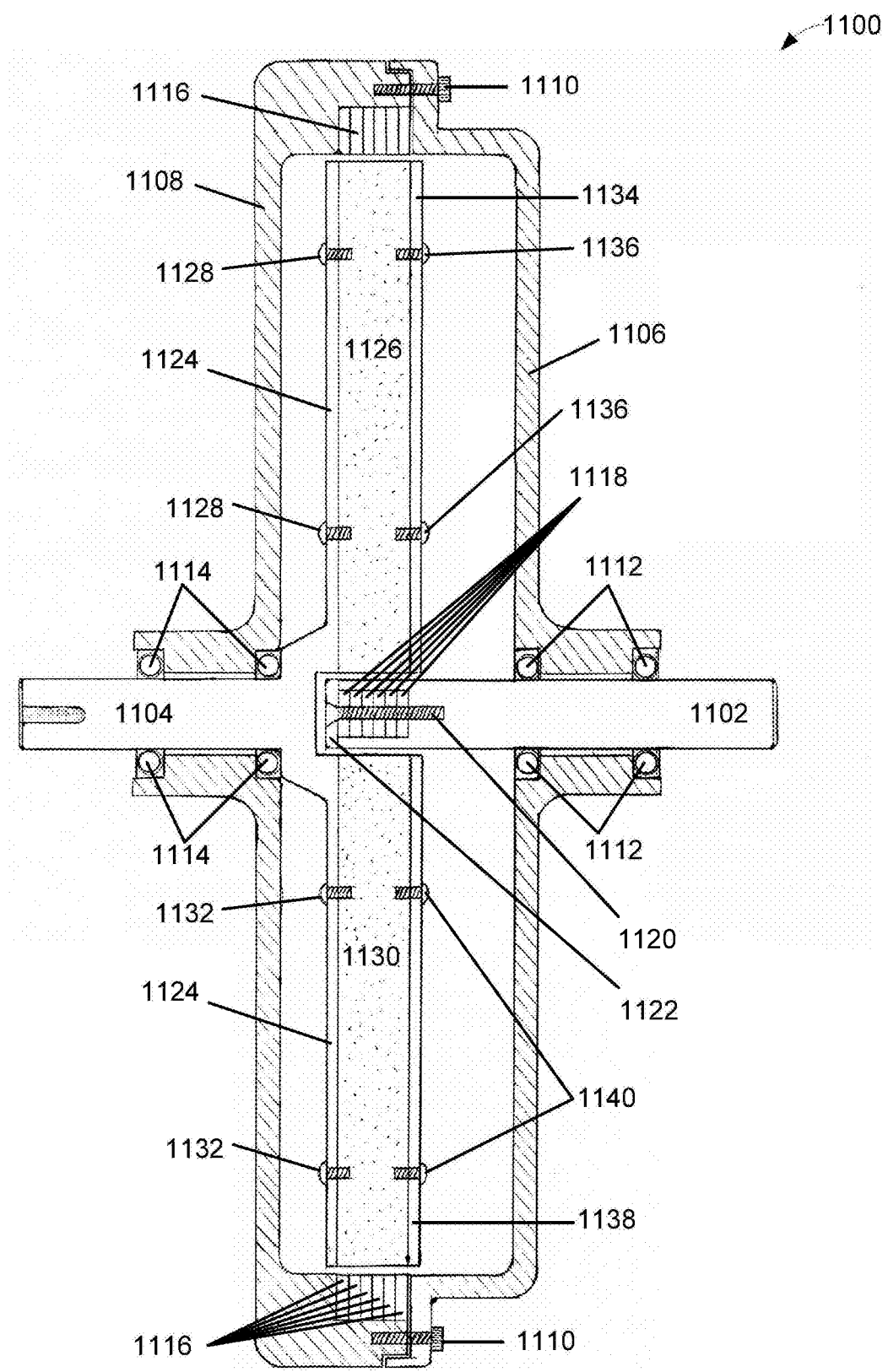
FIG. 11 illustrates, generally at 1100, a cross-sectional view of one embodiment of the invention showing an arrangement of major components.

FIG. 11 illustrates, generally at 1100, a cross-sectional view of one embodiment of the invention showing an arrangement of major components. At 1102 is a control shaft. At 1104 is an output shaft. At 1106 is an input housing. At 1108 is an output housing. The input housing 1106 and the output housing 1108 are secured to each other with representative screws 1110. Input control shaft 1102 is held in place by bearings 1112 which connect to the control shaft 1102 and the input housing 1106. The bearings 1112 may be one-way bearings. Output control shaft 1104 is held in place by bearings 1114 which connect to the output shaft 1104 and the output housing 1108. The bearings 1114 may be one-way bearings. At 1116 is the stator showing laminations (as the vertical lines). The 1116 notation near the bottom of the figure shows the individual stator laminations. At 1118 are the radial field control laminations which are attached to the control shaft 1102 via a screw 1120 and end cap 1122. The output shaft 1104 has a vertical member 1124 attached to it that is perpendicular to the output shaft 1104. To this vertical member 1124 is attached permanent magnet 1126 via screws 1128. Also attached to this vertical member 1124 is permanent magnet 1130 via screws 1132. Member 1134 is also attached to permanent magnet 1126 via screws 1136. Member 1138 is also attached to permanent magnet 1130 via screws 1140.

Figure 12:
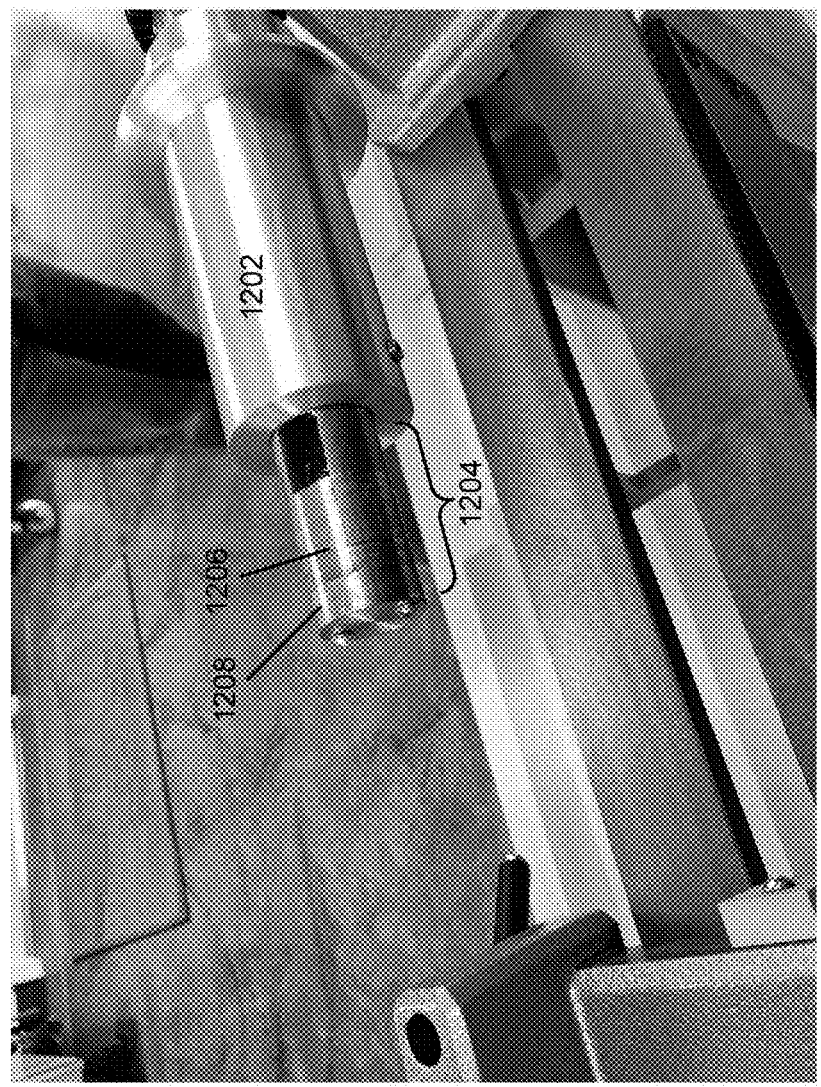
FIG. 12 illustrates, generally at 1200, one embodiment of the invention showing a radial field control.

FIG. 12 illustrates, generally at 1200, an embodiment showing a control shaft 1202 having mounted thereon a radial field control 1204, showing the laminations at 1206, which are mounted within a brass assembly 1208.

Figure 13:
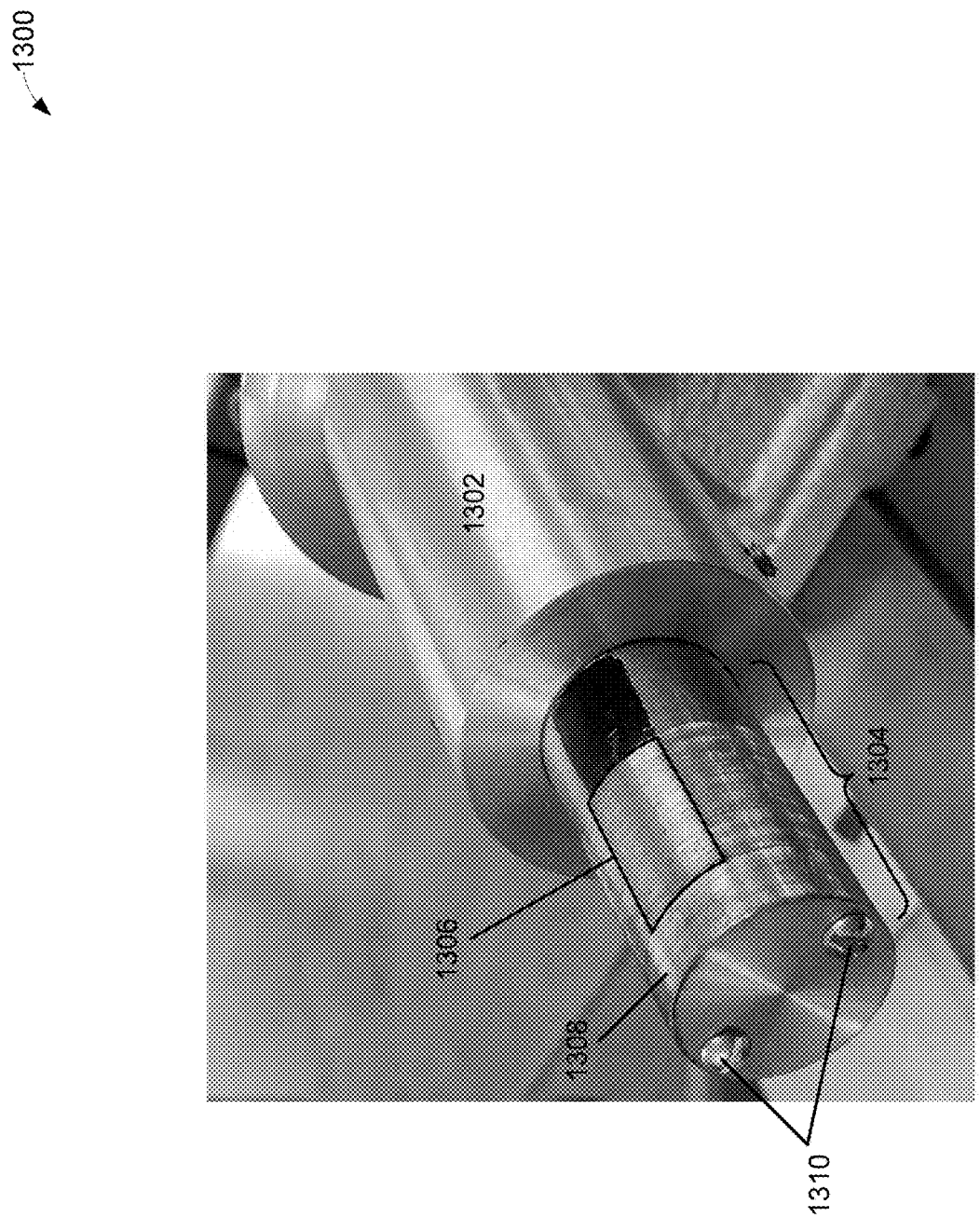
FIG. 13 illustrates, generally at 1300, one embodiment of the invention showing a radial field control.

FIG. 13 illustrates, generally at 1300, an embodiment showing a control shaft 1302 having mounted thereon a radial field control 1304, showing the laminations at 1306 (outlined by box), which are mounted within a brass assembly 1308, with screws 1310.

Figure 14:
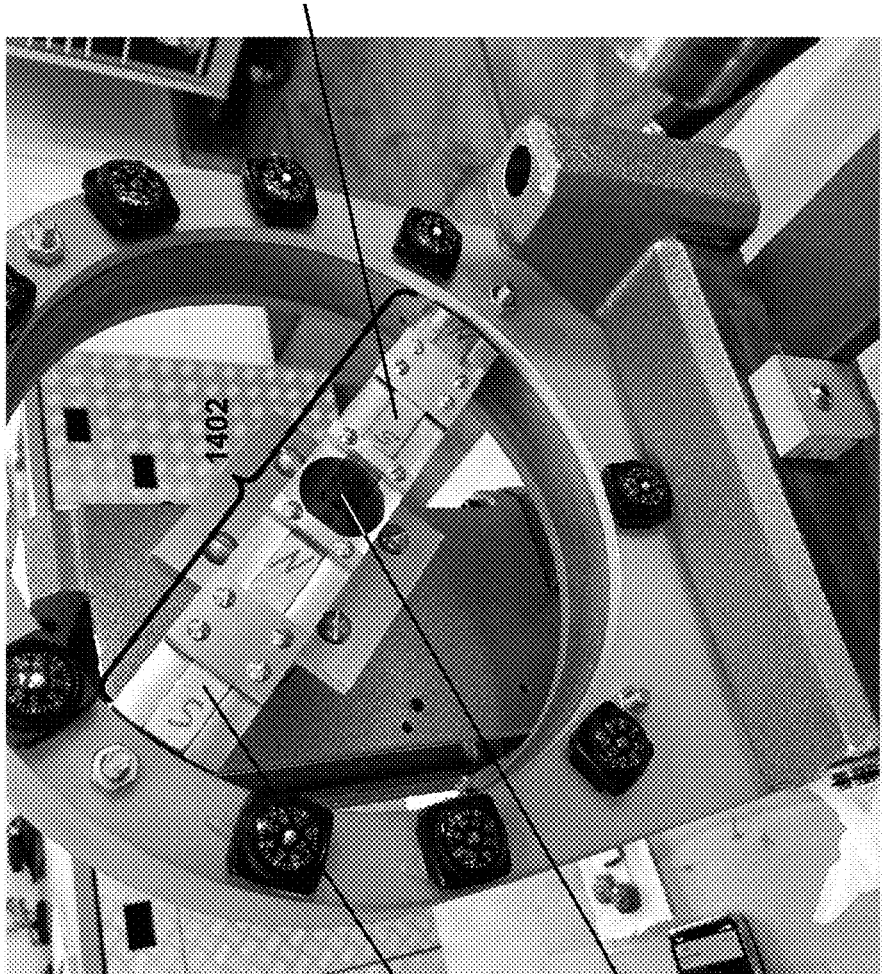
FIG. 14 illustrates, generally at 1400, one embodiment of the invention showing an armature.

FIG. 14 illustrates, generally at 1400, an embodiment showing an armature 1402 with permanent magnet 1404 and permanent magnet 1406. At 1408 is the opening into which the radial field control is positioned.

Note that because there are magnetic fields involved, some of the components, for example the permanent magnet holders may be made of materials less magnetic, for example, but not limited to brass, aluminum, copper, non-magnetic metals, fiberglass, carbon fiber, etc.

In other embodiments the components may be assembled and fastened with other approaches, such as, but not limited to, rivets, welding, gluing, wedging, etc.

Figure 15:
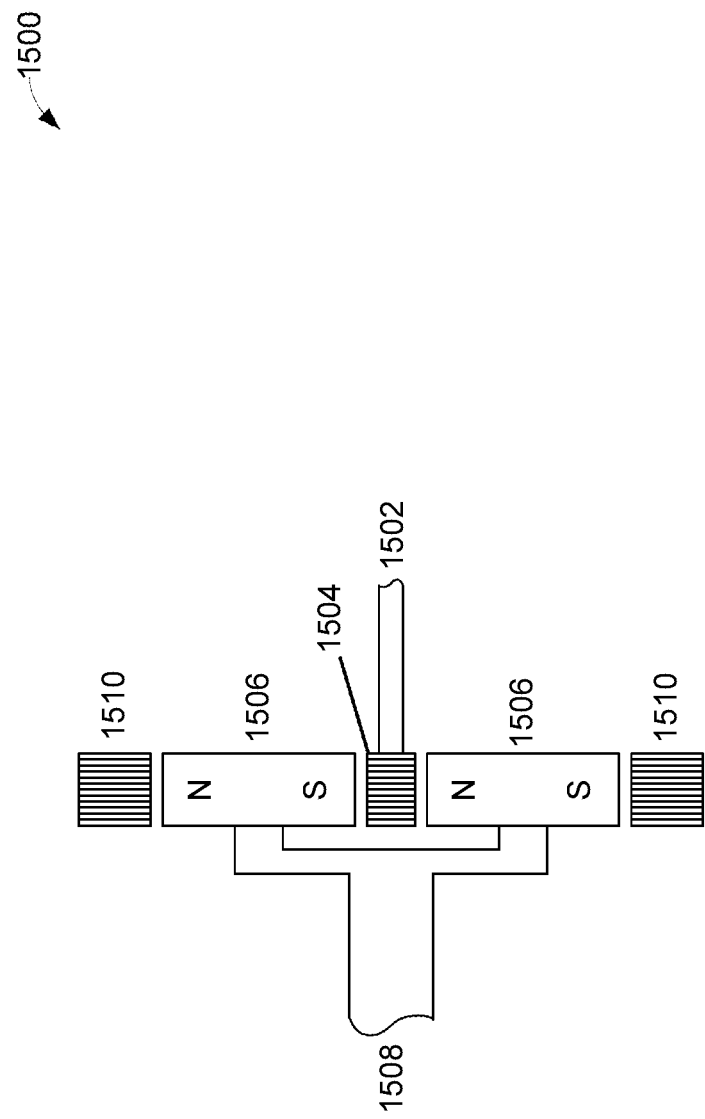
FIG. 15 illustrates, generally at 1500, a cross-section representation of one embodiment of the invention showing an arrangement of major components.

FIG. 15 illustrates, generally at 1500, a cross-section representation of one embodiment of the invention showing an arrangement of major components. For clarity of illustration the components are not to scale and gaps and/or distances between the components are exaggerated. At 1502 is control shaft, having at 1504 a radial field control having its own laminations. At 1506 are permanent magnets which are part of the armature which are coupled to an output shaft 1508. At 1510 are shown laminations of a stator. In this embodiment the width of the radial field control 1504, the width of the permanent magnets 1506, and the width of the laminations of the stator 1510 are substantially equal in width. However, the invention is not so limited.

Figure 16:
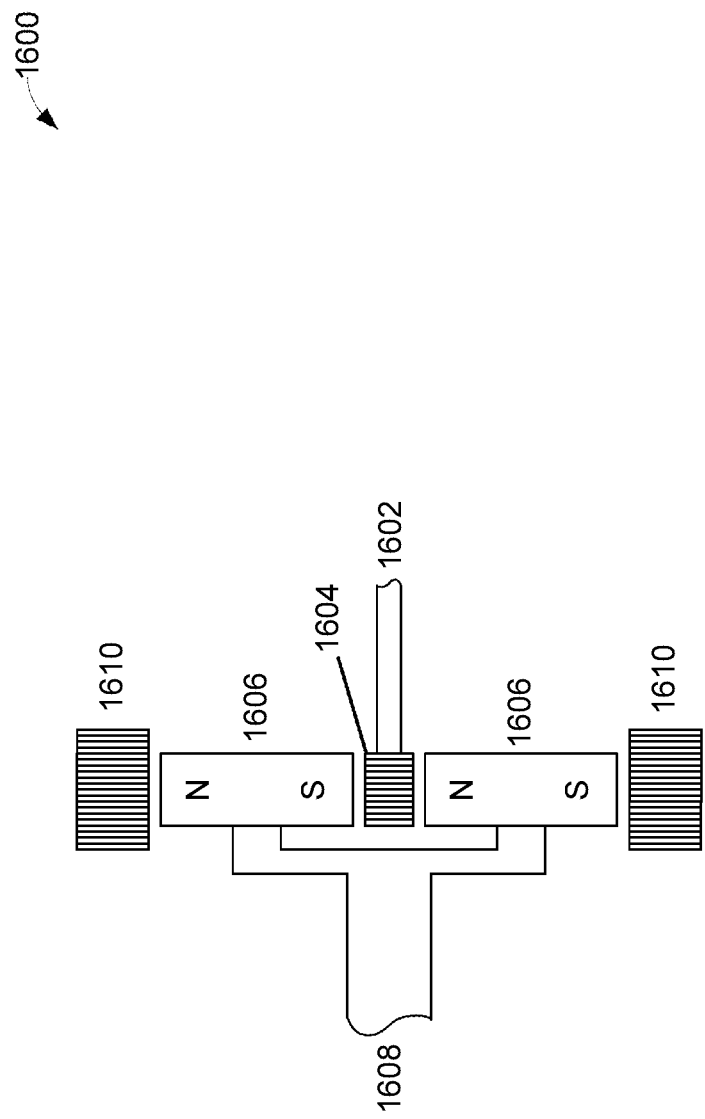
FIG. 16 illustrates, generally at 1600, a cross-section representation of one embodiment of the invention showing an arrangement of major components.

FIG. 16 illustrates, generally at 1600, a cross-section representation of one embodiment of the invention showing an arrangement of major components. For clarity of illustration the components are not to scale and gaps and/or distances between the components are exaggerated. At 1602 is control shaft, having at 1604 a radial field control having its own laminations. At 1606 are permanent magnets which are part of the armature which are coupled to an output shaft 1608. At 1610 are shown laminations of a stator. In this embodiment the width of the laminations of the stator 1610 are wider than the width of the radial field control 1604. However, the invention is not so limited and the width of the laminations of the stator 1610 could be narrower than the width of the radial field control 1604 (not shown in FIG. 16).

Figure 17:
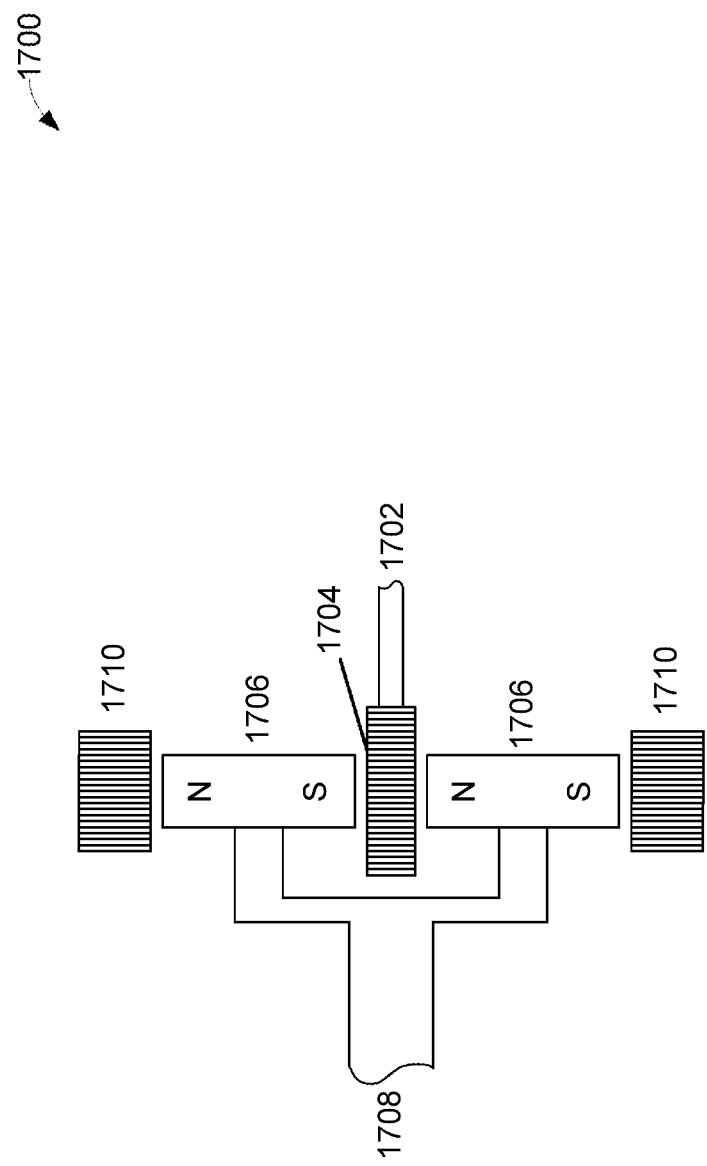
FIG. 17 illustrates, generally at 1700, a cross-section representation of one embodiment of the invention showing an arrangement of major components.

FIG. 17 illustrates, generally at 1700, a cross-section representation of one embodiment of the invention showing an arrangement of major components. For clarity of illustration the components are not to scale and gaps and/or distances between the components are exaggerated. At 1702 is control shaft, having at 1704 a radial field control having its own laminations. At 1706 are permanent magnets which are part of the armature which are coupled to an output shaft 1708. At 1710 are shown laminations of a stator. In this embodiment the width of the laminations of the stator 1710 are narrower than the width of the radial field control 1704. However, the invention is not so limited and the width of the laminations of the radial field control 1704 could be narrower than the width of the permanent magnets 1706 (not shown in FIG. 17).

While a single radial field control and output armature have been shown ("single arrangement"), the invention is not so limited and multiples of such "single arrangement" may be put in series or parallel arrangements.

For a parallel arrangement, two single arrangements can be placed side by side and a cog belt can connect the two control shafts which each have a cog pulley on the control shaft. In this way, just like a timing belt, the two control shafts can be kept in lock step. Likewise, for the two output shafts they can both have a cog pulley on the output shaft and be connected via a cog belt. Again, just like a timing belt, the two output shafts can be kept in lock step.

Figure 18:
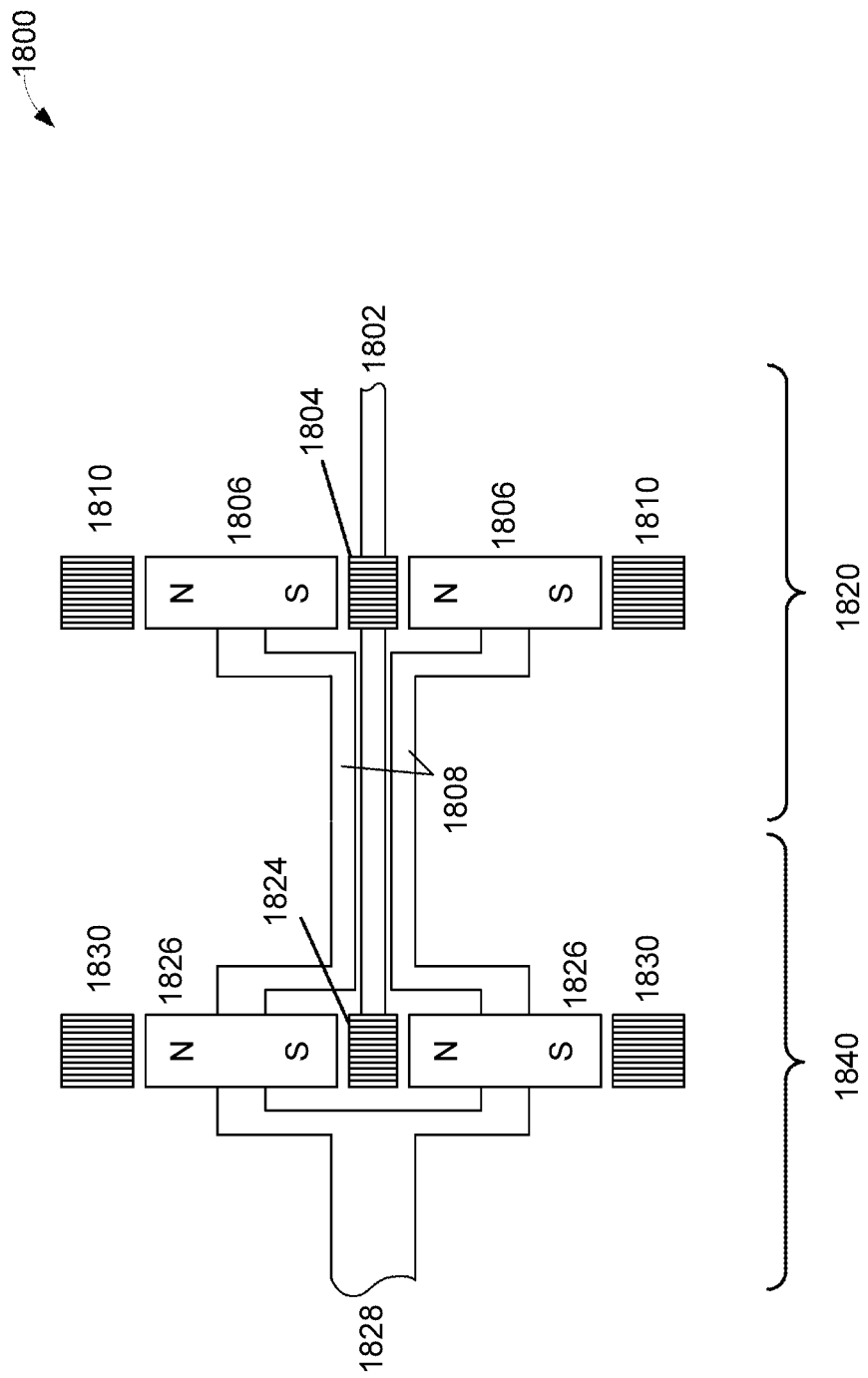
FIG. 18 illustrates, generally at 1800, a cross-section representation of one embodiment of the invention showing an arrangement of major components for a series connection of two single arrangements.

FIG. 18 illustrates, generally at 1800, a cross-section representation of one embodiment of the invention showing an arrangement of major components for a series connection of two single arrangements 1820 and 1840. For clarity of illustration the components are not to scale and gaps and/or distances between the components are exaggerated. At 1802 is a control shaft having at 1804 a first radial field control having its own laminations, and the control shaft 1802 extends through hollow member 1808 to 1824 a second radial field control having its own laminations. At 1806 are permanent magnets which are part of the armature which are coupled to hollow member 1808. Hollow member 1808 is also coupled to a second set of permanent magnets 1826. At

1828 is an output shaft which is also coupled to permanents magnets 1826. At 1810 are shown laminations of a first stator, and at 1830 are shown laminations of a second stator. In such an arrangement the first radial field control laminations 1804 may or may not have the same orientation on the control shaft 1802 as the second radial field control laminations 1824. That is, they may be staggered in arrangement. As shown in FIG. 18 they are in a same orientation.

Figure 19:
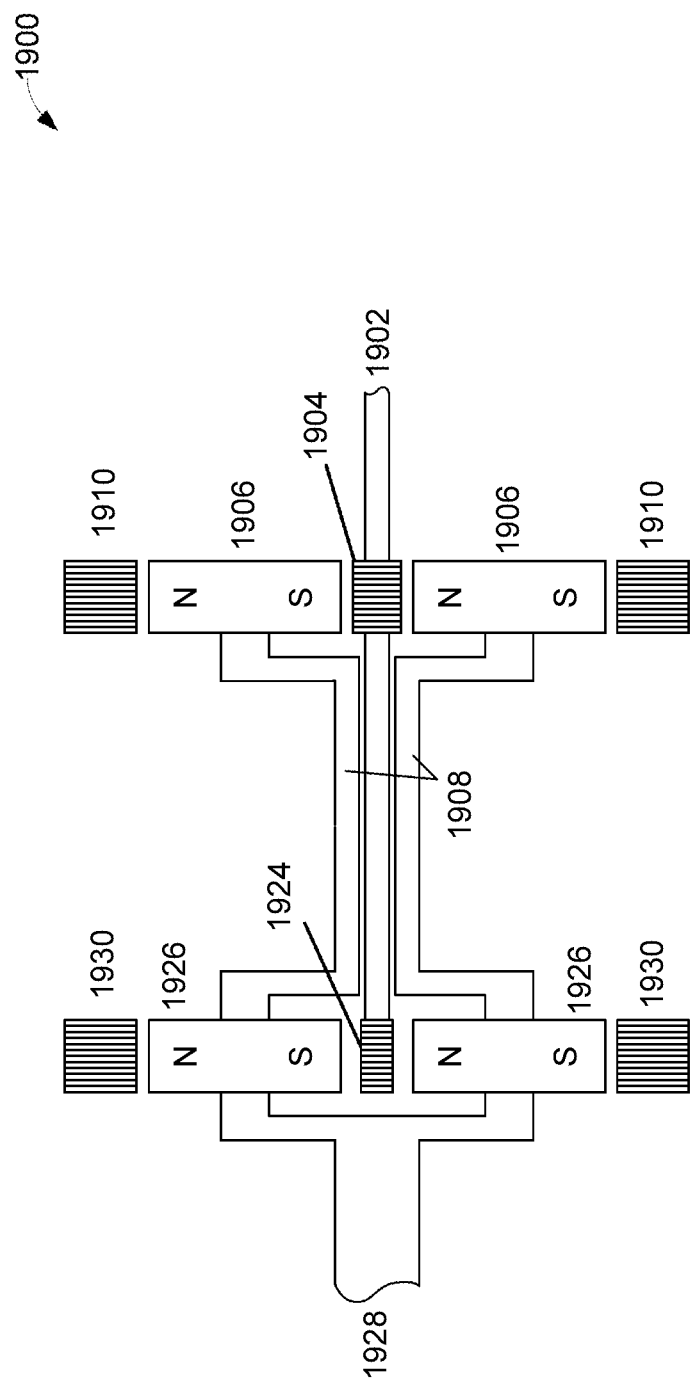
FIG. 19 illustrates, generally at 1900, a cross-section representation of one embodiment of the invention showing an arrangement of major components for a series connection of two single arrangements.

FIG. 19 illustrates, generally at 1900, a cross-section representation of one embodiment of the invention showing an arrangement of major components for a series connection of two single arrangements. For clarity of illustration the components are not to scale and gaps and/or distances between the components are exaggerated. At 1902 is a control shaft having at 1904 a first radial field control having its own laminations, and the control shaft 1902 extends through hollow member 1908 to 1924 a second radial field control having its own laminations. At 1906 are permanent magnets which are part of the armature which are coupled to hollow member 1908. Hollow member 1908 is also coupled to a second set of permanent magnets 1926. At 1928 is an output shaft which is also coupled to permanents magnets 1926. At 1910 are shown laminations of a first stator, and at 1930 are shown laminations of a second stator. In such an arrangement the first radial field control laminations 1904 may or may not have the same orientation on the control shaft 1902 as the second radial field control laminations 1924. That is, they may be staggered in arrangement. As shown in FIG. 19 they are staggered in orientation as can be seen the height of the first radial field control 1904 is larger than the second radial field control 1924.

Note that during the rotation of the control shaft there is interaction with the output shaft which has the armature with the permanent magnets attached and both the control shaft and output shaft may try and turn the other in a different direction than desired. That is, for example, as the control shaft rotates in a given direction the output shaft may try and rotate it in the opposite direction (i.e. backwards). In one embodiment, the control shaft cannot be forced backwards by the output shaft if one-way bearings hold the control shaft. Likewise, in one embodiment, one-way bearings may be used to hold the output shaft so that it can only rotate in one direction. In one embodiment, the control shaft and the output shaft are each held by one-way bearings.

In the specification and figures the control shaft as noted has attached to it the radial field control, this control shaft may be rotated, for example, by a motor or other rotating mechanism. What is to be appreciated is that the control shaft having the radial field control is able to control the armature rotating within a magnetic circuit. The magnetic circuit comprises the radial field control the armature having permanent magnets and the stator. The output shaft which is connected to the armature can rotate (assuming it is not overloaded or locked) and this rotary motion can be used. Thus, the input control shaft can control the output shaft.

While the description has shown two permanent magnets as part of the armature the invention is not so limited and any arrangement of magnets on the armature that yields a magnetic flux passing through the radial field control and stator can be used.

Figure 20:
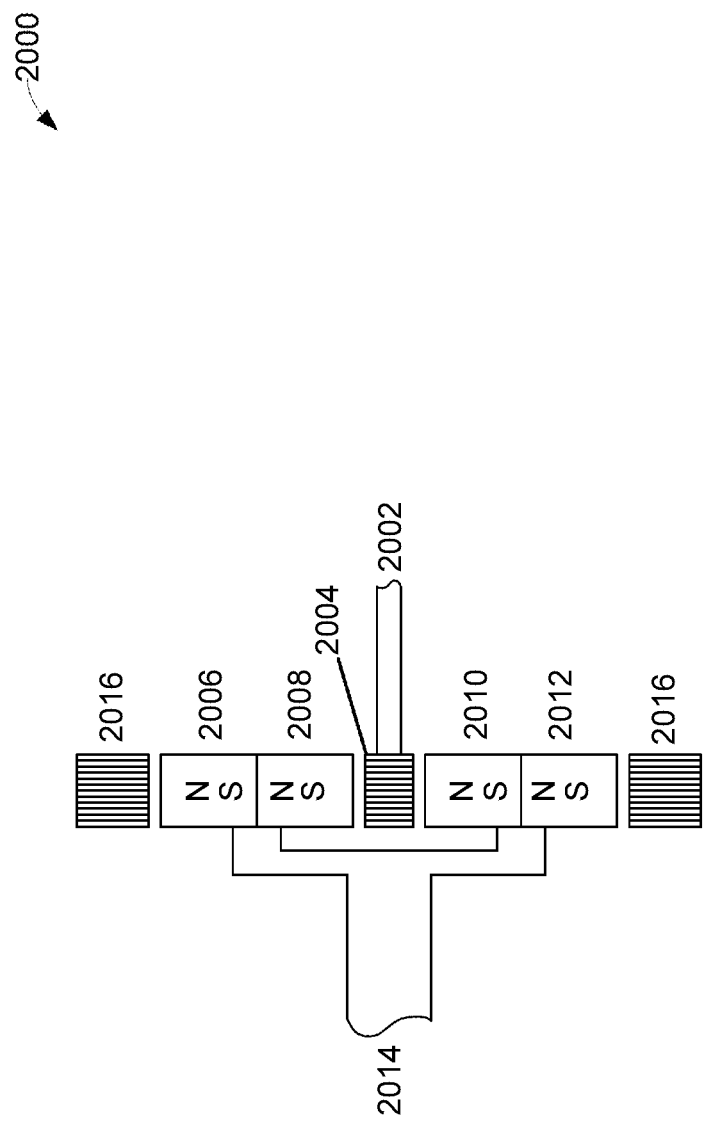
FIG. 20 illustrates, generally at 2000, a cross-section representation of one embodiment of the invention showing an arrangement of major components.

FIG. 20 illustrates, generally at 2000, a cross-section representation of one embodiment of the invention showing an arrangement of major components. For clarity of illustration the components are not to scale and gaps and/or distances between the components are exaggerated. At 2002 is a control shaft, having at 2004 a radial field control having its own laminations. At 2006, 2008, 2010, and 2012 are permanent magnets which are part of the armature which are coupled to an output shaft 2014. At 2016 are shown laminations of a stator. As can be seen magnets 2006 and 2008 are stacked in series to increase the magnetic strength compared to a single magnet. Likewise, magnets 2010 and 2012 are stacked in series to increase the magnetic strength compared to a single magnet.

Figure 21:
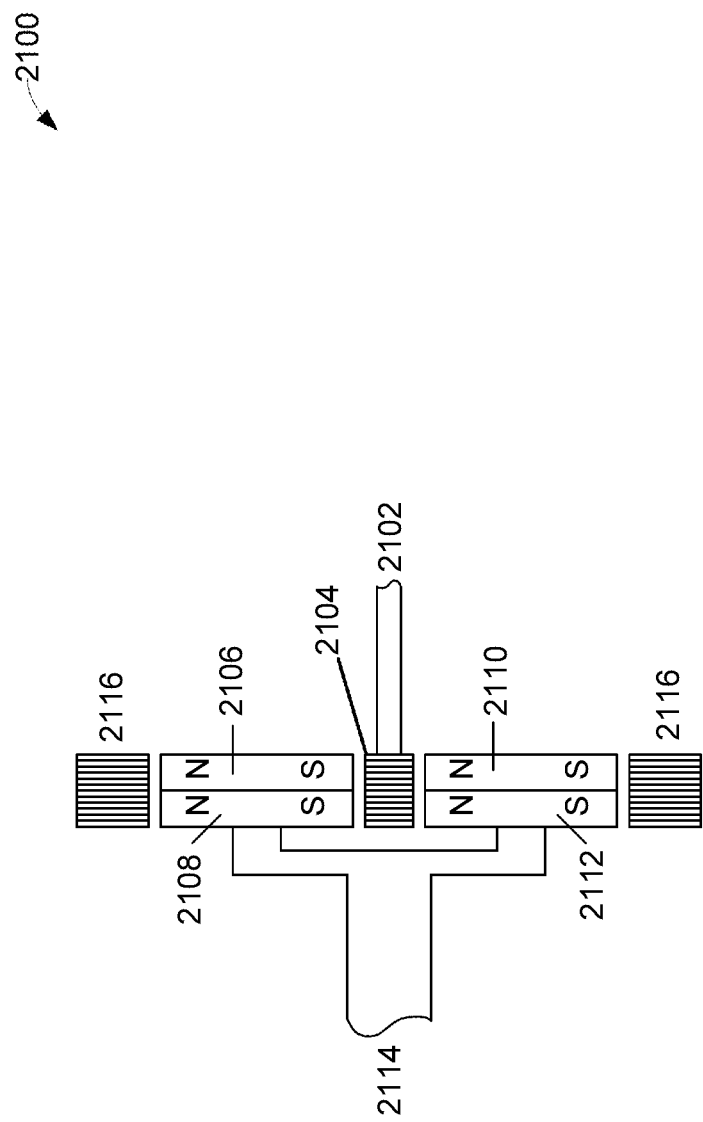
FIG. 21 illustrates, generally at 2100, a cross-section representation of one embodiment of the invention showing an arrangement of major components.

FIG. 21 illustrates, generally at 2100, a cross-section representation of one embodiment of the invention showing an arrangement of major components. For clarity of illustration the components are not to scale and gaps and/or distances between the components are exaggerated. At 2102 is a control shaft, having at 2104 a radial field control having its own laminations. At 2106, 2108, 2110, and 2112 are permanent magnets which are part of the armature which are coupled to an output shaft 2114. At 2116 are shown laminations of a stator. As can be seen magnets 2106 and 2108 are side by side. Likewise, magnets 2110 and 2112 are side by side.

Figure 22:
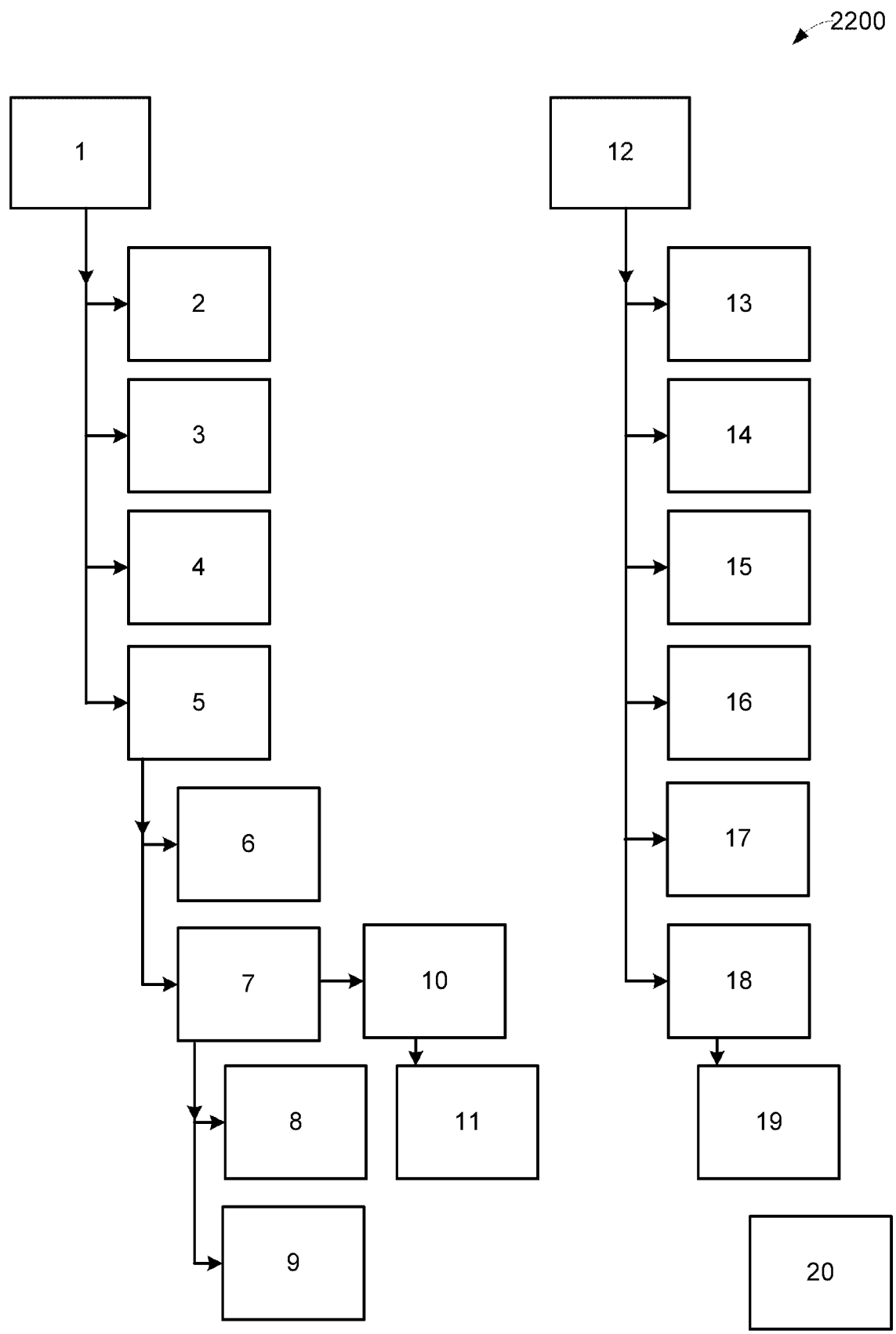
FIG. 22 illustrates, generally at 2200, various embodiments of the invention.

FIG. 22 illustrates, generally at 2200, various embodiments of the invention. At 1 poresiawy 1 an apparatus comprising: a control shaft having a longitudinal control axis for rotation; a radial field control, the radial field control mounted on the control shaft; an output shaft having a longitudinal output axis for rotation; an armature, the armature mounted on the output shaft; a stator having laminations, the stator laminations magnetically coupled to the armature; and the radial field control magnetically coupled to the armature. At 2 the apparatus of poresiawy 1 wherein the longitudinal control axis and the longitudinal output axis are coaxial. At 3 the apparatus of poresiawy 1 wherein the radial field control further comprises laminations and the radial field control laminations are perpendicular to the longitudinal control axis. At 4 the apparatus of poresiawy 1 wherein the radial field control further comprises laminations and the radial field control laminations are parallel to the longitudinal control axis. At 5 the apparatus of poresiawy 1 wherein the armature further comprises two or more permanent magnets. At 6 the apparatus of poresiawy 5 wherein a north pole of one of the two or more permanent magnets is proximate to the radial field control. At 7 the apparatus of poresiawy 6 wherein a south pole of one of the two or more permanent magnets is proximate to the radial field control. At 8 the apparatus of poresiawy 7 wherein the control shaft is held by one or more one-way bearings. At 9 the apparatus of poresiawy 7 wherein the output shaft is held by one or more one-way bearings. At 10 the apparatus of poresiawy 7 wherein the stator further comprises a plurality of laminations. At 11 the apparatus of poresiawy 10 wherein each of laminations in the plurality of laminations have one or more pole tips. At 12 an apparatus comprising: an outer input housing cover having an opening; a rotatable input control shaft having mounted thereon a radial field control; an input bearing, the input bearing mounted into the outer input housing cover opening and onto the rotatable input control shaft; an outer output housing cover having an opening; a rotatable output shaft; an output bearing, the output bearing mounted into the outer output housing cover opening and onto the rotatable output shaft; a radial field control coupled to the rotatable input control shaft, the radial field control having laminations; an armature coupled to the rotatable output shaft, the armature having permanent magnets and an opening concentric about the armature axis of rotation; a stator, the stator positioned proximate to the armature; and the radial field control positioned within the armature opening. At 13 the apparatus of poresiawy 12 wherein the stator further comprises a plurality of pole tips.

At 14 the apparatus of poresiawy 12 wherein the radial field control further comprises a plurality of laminations. At 15 the apparatus of poresiawy 12 wherein the input bearing is a one way bearing. At 16 the apparatus of poresiawy 12 wherein the output bearing is a one way bearing. At 17 the apparatus of poresiawy 12 wherein the input bearing is a one way bearing and allows rotation in a first direction, and wherein the output bearing is a one way bearing and allows rotation in a second direction, and wherein the first direction and the second direction are a same direction. At 18 the apparatus of poresiawy 12 wherein an axis of rotation for the rotatable input control shaft and an axis of rotation for the rotatable output shaft are coaxial. At 19 the apparatus of poresiawy 18 wherein magnetic lines of flux from the armature having permanent magnets flows through the stator and the radial field control. At 20 a method comprising: positioning a rotatable radial field control between a north magnetic pole of a first permanent magnet on a rotatable armature and a south magnetic pole of a second permanent magnet on the rotatable armature; and positioning the rotatable armature within a stator where a south magnetic pole of the first permanent magnet on the rotatable armature and a north magnetic pole of the second permanent magnet on the armature are proximate to the stator.

Thus a Method and Apparatus to Control an Armature Rotating within a Magnetic Circuit have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus to Control an Armature Rotating within a Magnetic Circuit have been described.

What is claimed is:

1. An apparatus comprising:
   a control shaft having a longitudinal control axis for rotation;
   a radial field control, the radial field control mounted on the control shaft, the radial field control having no permanent magnets;
   an output shaft having a longitudinal output axis for rotation;
   a non-electromagnetic armature, the non-electromagnetic armature mounted on the output shaft;
   a non-electromagnetic stator having laminations, the non-electromagnetic stator laminations magnetically coupled to the non-electromagnetic armature;
   the radial field control magnetically coupled to the non-electromagnetic armature; and
   the output shaft to rotate in response to a control shaft rotation.

2. The apparatus of claim 1 wherein the longitudinal control axis and the longitudinal output axis are coaxial.

3. The apparatus of claim 1 wherein the radial field control further comprises laminations and the radial field control laminations are perpendicular to the longitudinal control axis.

4. The apparatus of claim 1 wherein the radial field control further comprises laminations and the radial field control laminations are parallel to the longitudinal control axis.

5. The apparatus of claim 1 wherein the non-electromagnetic armature further comprises two or more permanent magnets.

6. The apparatus of claim 5 wherein a north pole of one of the two or more permanent magnets is proximate to the radial field control.

7. The apparatus of claim 6 wherein a south pole of one of the two or more permanent magnets is proximate to the radial field control.

8. The apparatus of claim 7 wherein the control shaft is held by one or more one-way bearings.

9. The apparatus of claim 7 wherein the output shaft is held by one or more one-way bearings.

10. The apparatus of claim 7 wherein one or more of the non-electromagnetic stator laminations has one or more pole tips.

11. The apparatus of claim 10 wherein the one or more pole tips does not have a constant radius from the longitudinal control axis.

12. An apparatus comprising:
   an outer input housing cover having an opening;
   a rotatable input control shaft having mounted thereon a radial field control, the radial field control having no permanent magnets;
   an input bearing, the input bearing mounted into the outer input housing cover opening and onto the rotatable input control shaft;
   an outer output housing cover having an opening;
   a rotatable output shaft;

an output bearing, the output bearing mounted into the outer output housing cover opening and onto the rotatable output shaft;

a radial field control coupled to the rotatable input control shaft, the radial field control having laminations;

a non-electromagnetic armature coupled to the rotatable output shaft, the non-electromagnetic armature having permanent magnets and an opening concentric about the non-electromagnetic armature axis of rotation;

a non-electromagnetic stator, the non-electromagnetic stator positioned proximate to the non-electromagnetic armature;

the radial field control positioned within the non-electromagnetic armature opening; and the rotatable output shaft to rotate in response to a rotation of the rotatable input control shaft.

13. The apparatus of claim 12 wherein the non-electromagnetic stator further comprises a plurality of pole tips; and wherein each pole tip of the plurality of pole tips does not have a constant radius from a center of the non-electromagnetic stator.

14. The apparatus of claim 12 wherein the radial field control further comprises a plurality of laminations.

15. The apparatus of claim 12 wherein the input bearing is a one way bearing.

16. The apparatus of claim 12 wherein the output bearing is a one way bearing.

17. The apparatus of claim 12 wherein the input bearing is a one way bearing and allows rotation in a first direction, and wherein the output bearing is a one way bearing and allows rotation in a second direction, and wherein the first direction and the second direction are a same direction.

18. The apparatus of claim 12 wherein an axis of rotation for the rotatable input control shaft and an axis of rotation for the rotatable output shaft are coaxial.

19. The apparatus of claim 18 wherein magnetic lines of flux from the non-electromagnetic armature having permanent magnets flows through the non-electromagnetic stator and the radial field control.

20. A method comprising:

positioning a rotatable radial field control between a north magnetic pole of a first permanent magnet on a rotatable armature and a south magnetic pole of a second permanent magnet on the rotatable armature;

positioning the rotatable armature within a non-electromagnetic stator where a south magnetic pole of the first permanent magnet on the rotatable armature and a north magnetic pole of the second permanent magnet on the armature are proximate to the non-electromagnetic stator;

wherein the radial field control has no permanent magnets; and wherein the rotatable armature rotates in response to a rotation of the rotatable radial field control.

* * * * *